Patented May 12, 1925.

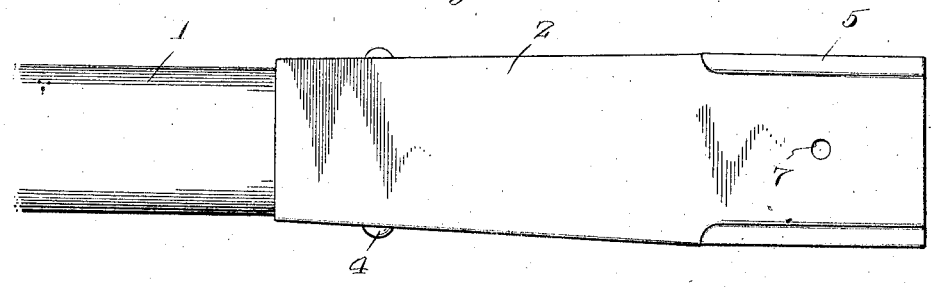
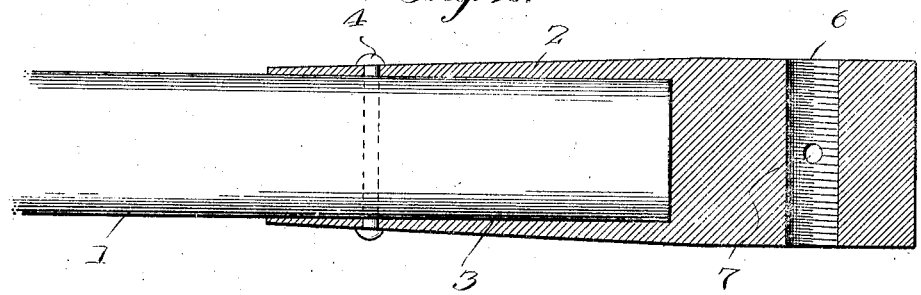
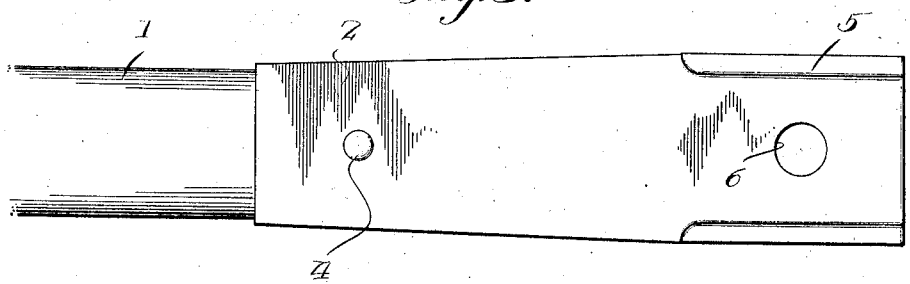
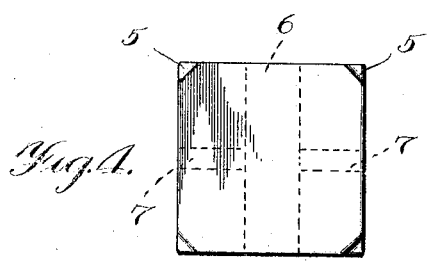

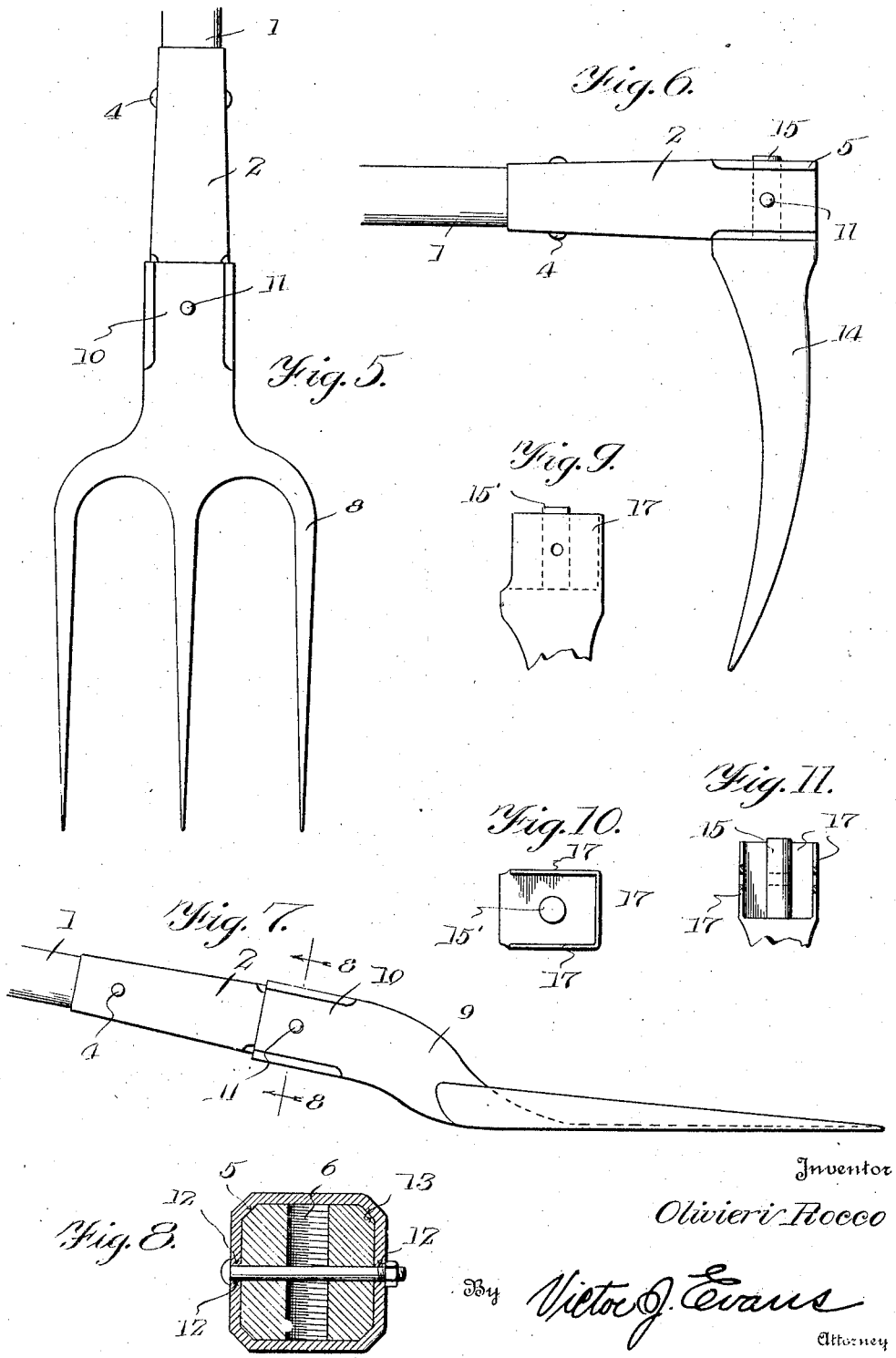

1,537,883

UNITED STATES PATENT OFFICE.

OLIVIERI ROCCO, OF BUFFALO, NEW YORK.

HANDLE FOR VARIOUS INSTRUMENTS.

Application filed February 2, 1924. Serial No. 690,288.

*To all whom it may concern:*

Be it known that I, OLIVIERI ROCCO, a subject of the King of Italy, residing at Buffalo, in the county of Erie and State of New York, have invented new and useful Improvements in Handles for Various Instruments, of which the following is a specification.

This invention relates to a handle for tools, the general object of the invention being to provide means whereby various kinds of tools can be connected with the handle.

Another object of the invention is to provide reinforcing means where the handle is to be used with heavy tools.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the handle and its ferrule.

Figure 2 is a longitudinal sectional view.

Figure 3 is a top view.

Figure 4 is an end view.

Figure 5 is a view showing a fork attached to the handle.

Figure 6 is a view of a pick connected with the handle.

Figure 7 is a view of a shovel connected with the handle.

Figure 8 is a section on line 8—8 of Figure 7.

Figures 9, 10, and 11 are views showing reinforcing means for heavy tools.

In these views, 1 indicates the handle and 2 indicates a ferrule which is provided with a socket 3 for receiving one end of the handle, the handle being secured in the socket by the bolt 4. The free end of the ferrule is of rectangular shape in cross section with its corners slightly beveled, as shown at 5. It is provided with a transversely extending threaded opening 6 and an opening 7 which passes through the opening 6 at right angles thereto. The fork 8 and the shovel 9 are provided with sockets 10 for receiving the end of the ferrule and these parts are adapted to be detachably connected with the ferrule by a pin 11 which passes through holes 12 formed in the sockets 10 and the hole 7 in the ferrule. The sockets are provided with beveled portions 13 for engaging the beveled portions 5 of the ferrule. The pick 14 is provided with a threaded stem 15 for engaging the threaded hole 6 and then the pin 11 is passed through the hole 7 and the hole 16 formed in the stem. It will of course be understood that hoes, axes, hammers and the like can be connected with the handle by having stems similar to the stem 15 formed thereon for engaging the threaded hole 6 and other tools can be formed with sockets similar to the socket 10 for receiving the ferrule, the tools shown simply being examples. When heavy tools are to be used with the device they may be reinforced by having flanges 17 formed thereon around the stem 15' for engaging the side walls of the ferrule while the stem engages the hole 6.

From the foregoing it will be seen that I have provided means whereby various kinds of tools can be used with the same handle, the connection being easily and quickly made, thus doing away with the bother of having a plurality of tools, each of which is provided with a long handle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of class described comprising a handle, a ferrule connected therewith and having a rectangular shaped end to engage a correspondingly shaped tool socket and means to receive a pin for detachably connecting the socketed tool with the ferrule, said ferrule also having a transversely arranged hole cooperating with said means and pin to alternately engage and secure a shanked tool.

In testimony whereof I affix my signature.

OLIVIERI ROCCO.